Patented June 3, 1924.

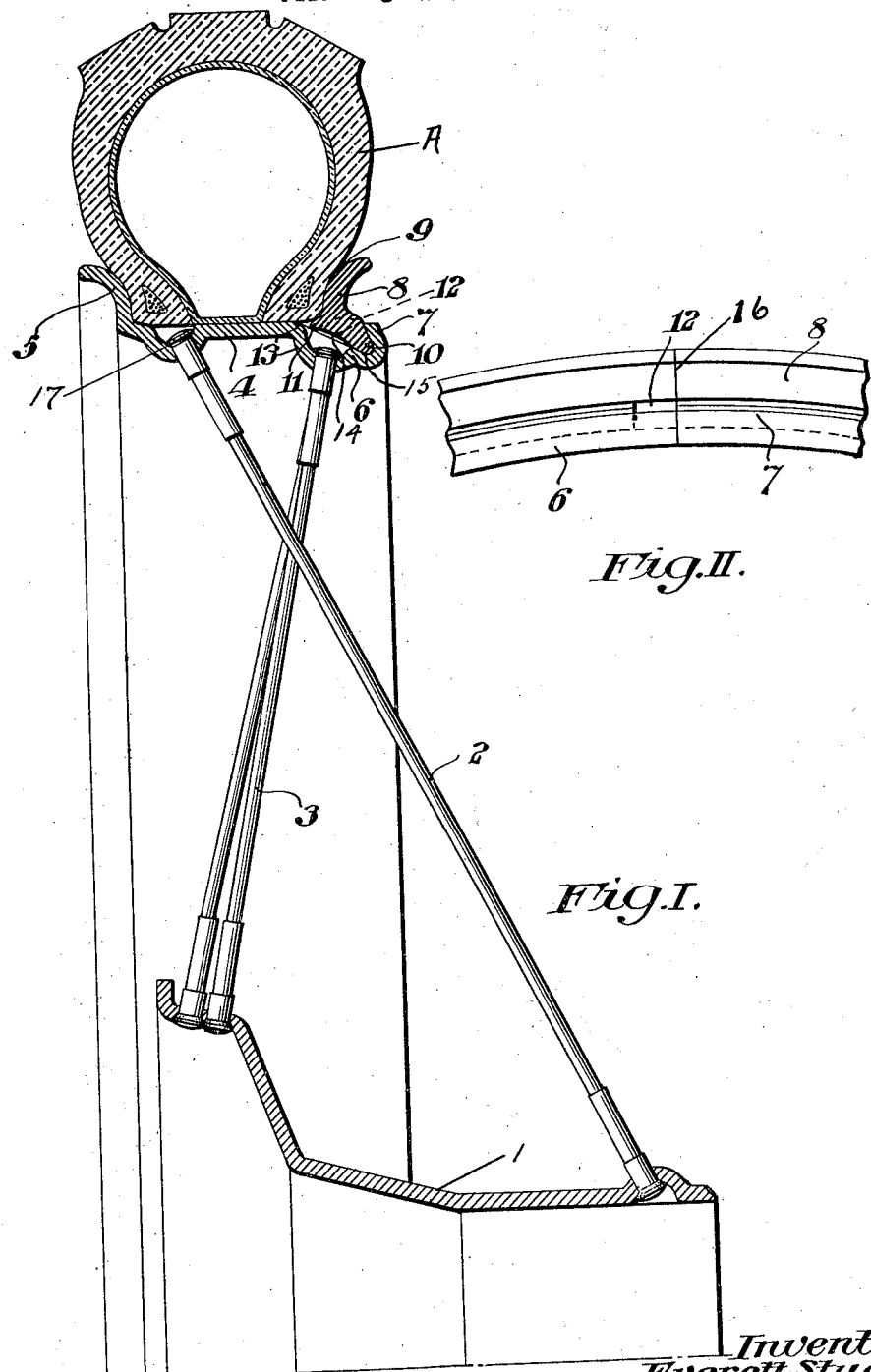

1,496,034

UNITED STATES PATENT OFFICE.

EVERETT STUCK, OF PHILADELPHIA, PENNSYLVANIA, ASSIGNOR, BY MESNE ASSIGNMENTS, TO BUDD WHEEL COMPANY, OF PHILADELPHIA, PENNSYLVANIA, A CORPORATION OF PENNSYLVANIA.

VEHICLE WHEEL RIM.

Application filed August 27, 1919. Serial No. 320,154.

*To all whom it may concern:*

Be it known that I, EVERETT STUCK, residing at Philadelphia, Philadelphia county, State of Pennsylvania, have invented certain new and useful Improvements in Vehicle Wheel Rims, of which I declare the following to be a full, clear, and exact description.

This invention relates to improvements in vehicle wheel rims and relates more particularly to rims adapted to receive and retain resilient tires and provided with a tire-retaining flange which is removable from the rim to permit of the ready removal of the tire.

One object of my invention is to provide a rim having a removable side flange which is securely locked in position when the tire is mounted on the rim and inflated and which, at the same time, permits the removal of the deflated tire without difficulty.

Another object of my invention is to provide a rim having a removable side flange so constructed that it is practically impossible to remove it when the tire is inflated.

Another object of my invention is to provide a rim construction in which the anchorages for one set of wire spokes are formed in the seat for the removable side flange thus connecting such set of spokes nearer the edge of the rim than would be possible otherwise and rendering it possible to give a wire wheel a greater off-set or "dish" without causing the spoke angle to approach too closely to the vertical.

Further objects, and objects relating to economies of operation and details of construction, will definitely appear from the detailed description to follow. In one instance, I accomplish the objects of my invention by the devices and means described in the following specification. My invention is clearly defined and pointed out in the appended claims. A structure constituting one embodiment of my invention is illustrated in the accompanying drawing, forming a part of this specification, in which:—

Figure I is a sectional view taken through a part of a wire wheel and rim embodying my invention.

Figure II is a fragmentary view, in side elevation, of the rim, showing the split in the removable side flange.

In the drawings, similar reference numerals refer to similar parts throughout the several views.

Considering the numbered parts of the drawing, I have shown a rim 4 having, at one edge thereof, the annular tire-retaining flange 5. At the other edge of the rim there is formed the inwardly extending ring seat 6 which is inclined obliquely to the central plane of the rim. From the inner edge of the ring seat the flange extends outwardly and towards the central plane of the rim and is spaced from the ring seat and this flange terminates below the main surface of the rim on which the base of the tire rests so that it offers no obstruction to the removal of the tire. A split ring 8 is removably mounted on said ring seat and has a base 10 the lower surface of which is concave at 14 and has a two-point bearing on the ring seat 6 at the points 11 and 15 adjacent the edges of said ring seat. The flange 7 overhangs said ring base and engages the outer surface thereof. The ring 8 has a flange portion 9 the side of which engages the side of the tire. The ring thus constitutes a removable side flange. The base of the ring projects somewhat beneath the base of the tire mounted on the rim and bears against the ring seat 6 at a point located beneath the base of the tire. The ring 8 is split at 16 and adjacent the split is provided with a notch 12 in which any suitable implement may be inserted to pry off the ring.

I have stated that the base, 10, of the split ring, 8, has a two-point bearing on the ring seat, 6. This statement is not literally accurate, as the base of the split ring bears on the ring seat along two parallel lines, and not at two points. However, any section taken through the ring and seat will cut such bearing lines in two points, so that considering such a section, it is proper to speak of the ring as having a two-point bearing. It is in that sense that I have used this term.

I have shown this rim construction in a wire wheel comprising a hub I connected to the rim by spokes 2 and 3. Perforated indentations or countersinks 17 are formed in the rim 4, in which the ends of spokes 2 are anchored, and similar perforated indentations or countersinks 13 are formed in the ring seat 6 in which the ends of spokes 3 are anchored. These countersinks 13 are located between the points at which the base 10 bears on the ring seat 6, and in line with the concave portion 14 of the base so that the spoke heads do not interfere with the perfect seating of the ring base 10. This construction enables me to connect the spokes 3 very close to the edge of the rim and hence I am able to offset or "dish" the wheel more without causing the spokes 3 to approach too closely to the vertical. This is important because otherwise sufficient "dish" cannot be given the wheel to cause it to track with a wood wheel when mounted on the standard automobile axle.

From the description of the parts given above, the operation of the device should be very readily understood. With the tire A mounted on the rim 4 and inflated, the split ring 8 is held to its seat partly by its inherent resiliency, partly by the flange 7, and partly by the engagement of the edge of tire base with the base 10 of the ring. When it is necessary to remove the tire, it is deflated and, a suitable tool being inserted in the notch 12, the ring is forced inwardly until the base 10 clears the flange 7 when the split ring may be pried from its seat or groove and removed. It will be seen that, due to the tire pressure, the ring cannot be removed until the tire is deflated thus avoiding what has caused many accidents with removable side flanges so constructed that they may be removed while the tire is inflated. Of course, when the ring is removed the tire can be taken off in the usual manner.

I am aware that the particular embodiment of my invention here shown and described may be varied considerably without departing from the spirit of my invention, and I therefore claim my invention broadly, as well as specifically, as indicated by the appended claims.

Having thus described my invention, what I claim as new and desire to secure by Letters Patent is:

1. A device of the class described comprising the combination of a rim having an annular tire retaining flange at one edge thereof, the opposite edge of said rim having an inwardly extending ring seat inclined obliquely to the central plane through the rim, and a split tire-retaining ring removably mounted on said seat and having a two-line bearing thereon.

2. A device of the class described comprising the combination of a rim having an annular tire-retaining flange at one edge thereof, the opposite edge of said rim having an inwardly extending ring seat inclined obliquely to the central plane through the rim, said seat having a flange extending outwardly therefrom, and terminating below the surface of said rim, and a split tire-retaining ring having a base mounted on said seat with a two-line bearing thereon, the outer surface of said base being engaged by said last-mentioned flange.

3. A device of the class described comprising the combination of a rim having an annular tire retaining flange at one edge thereof and an inwardly extending ring seat at the other edge thereof inclined obliquely to the central plane through said rim, and a split tire-retaining ring removably mounted on said seat and having a two-line bearing thereon, one of said bearing lines being so located as to lie beneath the base of the tire mounted on the rim.

4. A device of the class described comprising the combination of a rim having an annular tire retaining flange at one edge thereof and an inwardly extending ring seat at the other edge thereof, and a split tire-retaining ring removably mounted on said seat, said ring having a concave base with a two-line bearing on said seat.

5. A device of the class described comprising the combination of a rim having an annular tire-retaining flange at one edge thereof and an inwardly extending obliquely inclined ring seat at the other edge thereof, and a split tire-retaining ring removably mounted on said seat and having a base with a two-line bearing on said seat, said base being spaced from said seat between said bearing lines.

6. A device of the class described comprising the combination of a rim having an annular tire-retaining flange at one edge thereof, an inwardly extending ring seat at the other edge thereof inclined obliquely to the central plane through said rim and a flange extending outwardly from the edge of said seat, and a split tire-retaining ring removably mounted on said seat and having a base with a two-line bearing thereon, one of said bearing lines being so located as to lie beneath the base of a tire mounted on the rim and the other being located near the base of said last mentioned flange.

7. A device of the class described comprising the combination of a rim having an annular tire-retaining flange at one edge thereof and an inwardly extending ring seat at the other edge thereof inclined obliquely to the central plane of the rim, and a split tire-retaining ring removably mounted on said seat, said seat being provided with a plurality of countersinks forming spoke-head anchorages.

8. A device of the class described comprising the combination of a rim having an annular tire-retaining flange at one edge thereof, an inwardly extending ring seat at the other edge thereof inclined obliquely to the central plane of the rim, and a flange extending outwardly from the edge of said seat, and a split tire-retaining ring removably mounted on said seat, the last mentioned flange overhanging the base of said ring, said seat having a plurality of countersinks formed therein providing spoke-head anchorages.

9. A device of the class described comprising the combination of a rim having an annular tire-retaining flange at one edge thereof and an inwardly extending ring seat at the other edge thereof inclined obliquely to the central plane through said rim, and a split tire-retaining ring having a base removably mounted on said seat and bearing at lines thereon at the edges thereof, said base being spaced from said seat between said bearing points, said seat having a plurality of countersinks formed therein between said bearing lines providing spoke-head anchorages.

In testimony whereof, I affix my signature.

EVERETT STUCK.